US011733207B2

(12) United States Patent
Russell et al.

(10) Patent No.: US 11,733,207 B2
(45) Date of Patent: Aug. 22, 2023

(54) APPARATUS AND METHOD OF DETECTING DEFECTS IN BOILER TUBES

(71) Applicant: Russell NDE Systems Inc., Edmonton (CA)

(72) Inventors: David E. Russell, Edmonton (CA); Ankit Vajpayee, Edmonton (CA); Hoan Nguyen, Edmonton (CA); Yuwu Yu, Edmonton (CA)

(73) Assignee: Russell NDE Systems Inc., Edmonton (CA)

( * ) Notice: Subject to any disclaimer, the term of this patent is extended or adjusted under 35 U.S.C. 154(b) by 0 days.

(21) Appl. No.: 17/457,213

(22) Filed: Dec. 1, 2021

(65) Prior Publication Data
US 2022/0178878 A1 Jun. 9, 2022

Related U.S. Application Data

(60) Provisional application No. 63/122,873, filed on Dec. 8, 2020.

(51) Int. Cl.
*G01N 27/90* (2021.01)
*G01N 27/9093* (2021.01)
*G01N 27/87* (2006.01)

(52) U.S. Cl.
CPC ......... *G01N 27/9006* (2013.01); *G01N 27/87* (2013.01); *G01N 27/9046* (2013.01); *G01N 27/9093* (2013.01)

(58) Field of Classification Search
CPC .... G01N 27/87; G01N 27/90; G01N 27/9006; G01N 27/902; G01N 27/904; G01N 27/9046; G01N 27/9093

(Continued)

(56) References Cited

U.S. PATENT DOCUMENTS 5,245,279 A * 9/1993 Bendzsak ............... G01N 27/82
 324/225
11,428,668 B2 * 8/2022 Demers-Carpentier ....................
 G01N 27/9006

(Continued)

FOREIGN PATENT DOCUMENTS

CN 107941905 A * 4/2018 ......... G01N 27/9006
CN 108152367 A * 6/2018 ........... G01N 27/904

OTHER PUBLICATIONS

Translation of CN 108152367 A; Jun. 12, 2018; Google & EPO (Year: 2018).*

*Primary Examiner* — Alesa Allgood
*Assistant Examiner* — Rahul Maini
(74) *Attorney, Agent, or Firm* — Christensen O'Connor Johnson Kindness PLLC

(57) ABSTRACT

A probe 100 includes exciter units 102 arranged in an array and detector units 104 and 106, also arranged in arrays, with the arrays positioned proximal to and in the shape of the exterior circumference of an individual boiler tube 108. The detector units 104 are "absolute" coil detectors which are used to detect and quantify general wall loss, for example, resulting from steam impingement erosion. The detectors 106 are differential, axial pairs which are used for detecting pits in the boiler tubers. The exciter units and detector units are mounted in a stainless steel housing 110 of the probe. The housing 110 is shaped to closely match the contour of the boiler tube 108. The probe can be moved along the boiler tubes by hand to inspect the flame side of boiler tubes, one at a time. Wheels 112 are provided to roll the probe along the boiler tubes.

22 Claims, 14 Drawing Sheets

(58) Field of Classification Search
USPC .......................... 324/228, 229, 234, 236, 237
See application file for complete search history.

(56) References Cited

U.S. PATENT DOCUMENTS

2017/0030862 A1* 2/2017 Sirois ................. G01N 27/9006
2017/0241953 A1* 8/2017 Kagawa ................. G01N 27/82
2019/0072522 A1* 3/2019 Desjardins ............. G01N 27/87

* cited by examiner

APPARATUS AND METHOD OF DETECTING DEFECTS IN BOILER TUBES

CROSS-REFERENCE TO RELATED APPLICATION

This application claims the benefit of U.S. Provisional Application No. 63/122,873, filed Dec. 8, 2020, the entire contents of which are hereby incorporated by reference.

BACKGROUND

Tubes that transport water and steam in boilers are subject to a variety of service-induced defects that lead to boiler tube failures. Boiler tube failures are the leading cause of forced generator outages in thermal power plants. One cause of degradation in boiler tubes is boiler feed-water chemistry. If the feed-water chemistry is not suitable for the service conditions, it can lead to internal corrosion and hydrogen damage of the tubes as well as blisters in the tubes. These defects are located on the inside of the boiler tubes. Defects on the outside of the boiler tubes can be in the form of thermal fatigue cracking, flame erosion, fire-side erosion, corrosion pitting, and creep damage. It is important to detect and quantify the various forms of degradation before boiler tube failure occurs.

Fully inspecting the boiler tube each time it is taken out of service (forced or planned) is a costly and time-consuming process, so any inspection technique that can sense wall loss and other forms of degradation within the limited shutdown window would be of significant value to the power generation industry across the globe.

The inspection of boiler tubes has been accomplished with various techniques such as visual inspection, spot check ultra-sonic testing (UT), magnetic flux leakage (MFL) inspection, dye penetrant inspection (DPI), and magnetic particle inspection (MPI). However, each of these methods requires the boiler to be scaffolded so that inspection personnel can use these techniques to inspect the tubes. Scaffolding is expensive, and each of these listed techniques is time-consuming to implement.

The established inspection techniques have drawbacks. Spot check UT only gives localized thickness readings and achieves very minimal coverage of the total surface area of the boiler tubes. Thus, the chances of finding internal flaw mechanisms in the boiler tubes using spot check UT are minimal at best. If the boiler tubes have been sandblasted, "A-Scan" UT may be used to inspect larger areas. A-Scan UT is a technique that shows the time-based ultrasonic signal on a display allowing special probes such as "short range Guided Wave" probes to interrogate the tubes. These probes can direct an ultrasonic beam for up to two meters down the length of the tube. Reflections from flaws such as corrosion pits are then detected and evaluated for severity. In these cases, a steady flow of water is most often used as a couplant for the UT probe, and the tube has to be cleaned down to bare metal to allow the UT to couple to the tube.

The Electro-Magnetic Acoustic Technology (EMAT) technique requires that any boiler tubes surfaces be sandblasted to remove scale and ash which would otherwise compromise the technique. EMAT is similar to UT except that it does not need a liquid couplant. Instead, it couples the ultrasound energy to the tube wall by means of a strong magnet that is in close proximity to the tube. The technique modulates the magnetic coupling, which introduces a mechanical (ultrasonic) wave in the tube wall.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a probe is provided for inspecting boiler tubes for structural defects. The probe includes a rigid housing; a plurality of exciter units producing an alternating magnetic field when driven by an alternating current source, the magnetic field passing through the boiler tube walls and coupled with the boiler tube walls to induce the creation of eddy currents which in turn generate their own magnetic fields, the exciter units arrayed in the housing to correspond to the physical configuration of the boiler tubes; and a plurality of detector units configured to detect the magnetic field generated by the eddy currents that are induced in the boiler tube walls by the magnetic field generated by the exciter units, the detector units arrayed in the housing to correspond to the physical configuration of the boiler tubes, the detector units detecting the configuration and strength of the magnetic field generated by the eddy currents that are induced in the boiler tube walls by the magnetic field generated by the exciter units.

In any of the embodiments described herein, wherein the detector units comprise a magnetometer in the form of a small-scale micro-electrical mechanical device capable of detecting and measuring the magnetic field generated by the eddy currents.

In any of the embodiments described herein, wherein the detector units comprise devices configured to detect and quantify general wall thinning.

In any of the embodiments described herein, wherein the detector unit comprises absolute coils.

In any of the embodiments described herein, wherein the detector units comprise devices configured to detect pits formed in the boiler tube.

In any of the embodiments described herein, wherein the detector units comprise differential coils.

In any of the embodiments described herein, wherein at least two different types of detector units are employed, with each type of detector unit specific to a particular defect occurring in the boiler tube.

In any of the embodiments described herein, wherein the detector units are designed to detect and quantify a defect in the boiler selected from the group including general wall thinning, pitting, thermal fatigue, cracking, flame erosion, corrosion, and creep damage.

In any of the embodiments described herein, wherein the detector units are positioned at a distance from the exciter units, wherein the dominant magnetic field detected by the detector units is the eddy current induced magnetic field.

In any of the embodiments described herein, wherein the alternating current applied to the exciter units is in the range of less than 1 Hz to 500 Hz.

In accordance with one embodiment of the present disclosure, a method of detecting defects in boiler tubes is provided. The method includes placing a probe proximal to the exterior surface of the boiler tube, and moving the probe on the tube along the length of the tube; and, while moving the probe, producing an alternating magnetic field with the exciter units driven by an alternating current and detecting the magnetic field generated by the induced eddy currents caused by the alternating magnetic field produced by the exciter means using detector units.

In any of the embodiments described herein, wherein the alternating current applied to the exciter units is in the range of less than 1 Hz to 500 Hz.

In any of the embodiments described herein, wherein the probe is positioned proximal to the crown of the boiler to be inspected.

In any of the embodiments described herein, wherein the detector units comprise a magnetometer in the form of a small-scale micro-electrical mechanical device capable of detecting and measuring the magnetic field generated by the eddy currents.

In any of the embodiments described herein, wherein the detector units comprise devices configured to detect and quantify general wall thinning.

In any of the embodiments described herein, wherein the detector units comprise devices configured to detect pits formed in the boiler tube.

In any of the embodiments described herein, wherein the detector units comprise differential coils.

In any of the embodiments described herein, wherein at least two different types of detector units are employed, with each type of detector unit specific to a particular defect occurring in the boiler tube.

In any of the embodiments described herein, wherein the detector units are designed to detect and quantify a defect in the boiler selected from the group including general wall thinning, pitting, thermal fatigue, cracking, flame erosion, corrosion, and creep damage.

In any of the embodiments described herein, wherein the detector units are positioned at a distance from the exciter units.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
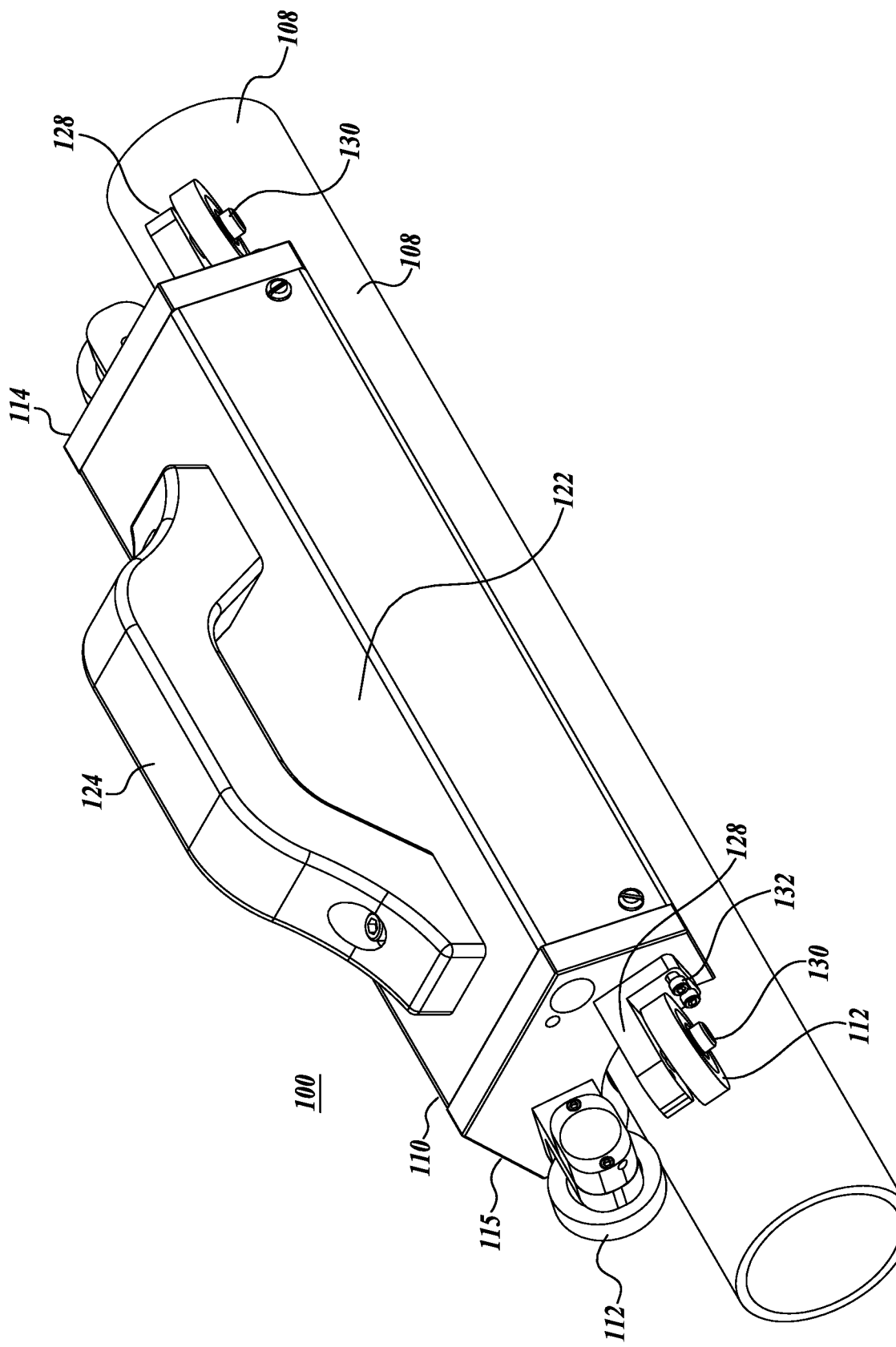
FIG. 1 is an isometric view of an embodiment of a probe of the present disclosure.

In the following description and in the accompanying drawing, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." these references and other similar references in the present application are only to assist in helping describe and understand the present disclosure and are not intended to limit the present invention to these directions.

The present application may include modifiers such as the words "generally," "approximately," "about," or "substantially." These are meant to serve as modifiers to indicate that the "dimension," "shape," "temperature," "time," or other physical parameter in question need not be exact, but instead may vary as long as the function that is required to be performed can be carried out. For example, in the phrase "generally circular in shape," the shape need not be exactly circular as long as the required function of the structure in question can be carried out.

In the present disclosure, boiler tubes are inspected using Through Transmission Field Measurement (TTFM). This is a method of non-destructive testing that uses a probe consisting of at least one exciter and at least one detector separated by a small distance (e.g., 2" to 10"), mounted in a rugged housing and used either manually or with the assistance of a robotic crawler, to assess the condition of the boiler tubes, including whether there are any corrosion or wall loss defects in the tube material. The exciter generates an alternating magnetic field, which couples to the ferrous metal boiler tube and induces the generation of eddy currents, which in turn generate their own magnetic fields. These eddy currents expand from the exciter in all directions within the tube wall. The detector is placed at a distance separated from the exciter means to detect the magnetic field of the eddy currents, and in particular to detect if there is any change in the eddy current magnet field as the probe is moved along the length of the boiler tube.

The detector is positioned where the magnetic field from the eddy currents is dominant so that it remains generally unaffected by the direct magnetic field from the exciter, but can still adequately measure the field strength produced by the eddy currents. In typical eddy current testing, the probes used have means that create a magnetic field and detect the eddy currents in a closely spaced area (i.e., the exciter and detector are deliberately placed together, or are in fact the same means that both excites and detects). TTFM probes, on the other hand, produce an alternating magnetic field and eddy currents that travel through the boiler tube wall and are detected by a detector means that may be on the far side of the tube, or separated from the exciter by two to ten inches.

The placement of the sensor means relative to the exciter means includes consideration of the interactions of the magnetic fields with the object (boiler tube) being inspected. The alternating magnetic field interacts with the magnetic domains in a ferromagnetic tube to be inspected. As it does so, the unique electro-magnetic field perturbations emanate from the localized areas of degradation in the tube. The probe for testing boiler tubes has strategically-placed small-scale detector means which are able to detect and record these localized field perturbations.

These perturbations are then processed in such a way as to differentiate their signals from any background magnetic fields present in the general vicinity of the probe (for example, fields from electrical equipment or motors that are nearby) and also the baseline magnetic fields of the non-corroded (virgin) tube material. The signals are then analyzed in reference to calibration defects, either simulated defects that are machined into a separate calibration tube or by using a natural degradation defect in a tube for which the defect morphology (length, width, depth, etc.) can be physically measured.

In one specific example of the present disclosure, as shown in FIGS. 1-4, a probe 100 includes exciter units 102 arranged in an array and detector units 104 and 106, also arranged in arrays, with the arrays positioned proximal to and in the shape of the exterior circumference of an individual boiler tube 108. The detector units 104 are "absolute" coil detectors which are used to detect and quantify general wall loss, for example, resulting from steam impingement erosion, which tends to be long, tapered, and gradually increasing in depth toward the center of the eroded area. The detectors 106 are differential, axial pairs which are used for detecting pits in the boiler tubers. The exciter units and detector units are mounted in a stainless steel housing 110 of the probe. The housing 110 is shaped to closely match the contour of the boiler tube 108. This particular probe embodiment is designed to be used by hand to inspect the flame side of boiler tubes, one at a time. Wheels 112 are provided to roll the probe along the boiler tube.

This embodiment has the advantage that the detector array 106 extends circumferentially around approximately one-third of the tube circumference, thereby maximizing the inspected area of the "flame side" of the tube where most defects occur. The probe 100 delivers an equivalent of up to 2000 thickness readings per foot, at a scanning speed of up to 10 feet/minute. The probe 100 can inspect through scale built up on the tube of up to 0.200" thickness and quantitatively detect internal and external defects with equal sensitivity. The probe 100 allows access to remote and difficult-to-reach areas (e.g., super-heater and re-heater tubes). An onboard odometer locates the defect position along the boiler tube 108.

In another embodiment of the present disclosure, a probe 200 includes exciter units 202 and two sets of detector units 204 and 206, each arranged in arrays configured so that the "crowns" (i.e., the sides of the tubes facing the inside of the boiler and therefore subject to the highest heat flux) of up to five boiler tubes 208 can be inspected simultaneously. As in probe 100, in probe 200 the detector units 204 are "absolute" coil detectors which are used to detect and quantify general wall loss for example resulting from steam impingement erosion, which tends to be long, tapered, and gradually increasing in depth toward the center of the eroded area. The detectors 206 are differential, axial pairs which are used for detecting pits in the boiler tubers.

Probe 200 is positioned proximal to the boiler tube 208 panel, such as those found in "boiler water walls," and is conveyed up the "wall" by a robot (not shown), which has magnetic powered wheels to ensure that the wheels stay in close contact with the tubes. The robot encoder is enabled to help locate the defect position(s) on the tube. An onboard closed circuit television unit (CCTV) (not shown) allows visual capturing (pictures and videos) of the external tube condition. Thus, probe 200 allows for continuous and rapid inspection and condition analysis of boiler tubes.

The probe 200 delivers an equivalent of up to 10,000 thickness readings per foot for up to five tubes simultaneously, at a user selectable scanning speed of, for example, 5, 10, 15, and 20 ft/minute. The probe 200 can inspect through scale of up to 0.200" thickness and quantitatively detect internal and external defects with equal sensitivity.

Next describing probe 100 in greater detail, as shown in FIGS. 1-5, the probe includes a housing 110 composed of end walls 114 and 115 forming the ends of the housing and held relative to each other by a top longitudinal beam member 116 extending centrally relative to the top of the housing structure to engage within slots formed in the tops of the end walls so that the top surface of the beam member 116 is flush with the adjacent top surfaces 118 and 119 of the end walls. A pair of side walls 120 also extend longitudinally between the end walls 114 and 115 along underside portions of the end walls. An upwardly convex bottom panel 121 extends between the lower edges of the sidewalls 120 to close off the bottom of the housing 110. The transverse curvature of the bottom panel closely corresponds to curvature of the outer surface of the boiler tube 108 so that the exciter and detector units 102 and 104 can be positioned very close to the exterior of the boiler tube 108.

The end walls 114 and 115 are in the form of flat transverse top edges 118 and 119 that intersect downwardly and outwardly sloped upper side edges, which in turn intersect downwardly and inwardly sloped lower side edges, and which in turn intersect an arcuate shaped bottom edge having a curvature corresponding to the curvature of the bottom panel 121 to which the end walls are attached.

A top cover 122 extends between the end walls 114 and 115 to close off the top of the housing 110. The ends of the cover 122 rest against the outer edges of the end walls 114 and 115. A shallow relief is formed in the outer edges of the end walls so that the outer surface of the cover is coextensive with the unrelieved outer edges of the end walls 114 and 115.

A handle 124 is mounted longitudinally centrally along and above the cover 122 to be used to manually grasp the probe 110 while rolling the probe along the boiler tube 108. The ends of the handle 124 are fixedly attached to the top beam 116.

Rollers 112 are mounted to the exterior of the end walls 114 and 115 by an angle shaped mounting brackets 128. The rollers (which may be magnetic wheels) 112 are rotatably mounted to the longitudinally projecting sections of the mounting brackets 128 by axles 130. The base portions of the mounting brackets 128 are attached to the exterior of the end walls 114 and 115 by hardware members 132 that extend through slots formed in the mounting bracket base portions to engage within threaded blind holes formed in the end walls 114 and 115. The slots enable the position of the rollers 112 to be adjusted so as to place the probe 100 very closely to the exterior surface of the boiler tube 108, without the end walls or the bottom panel 121 actually sliding against the boiler tube.

Figure 2:
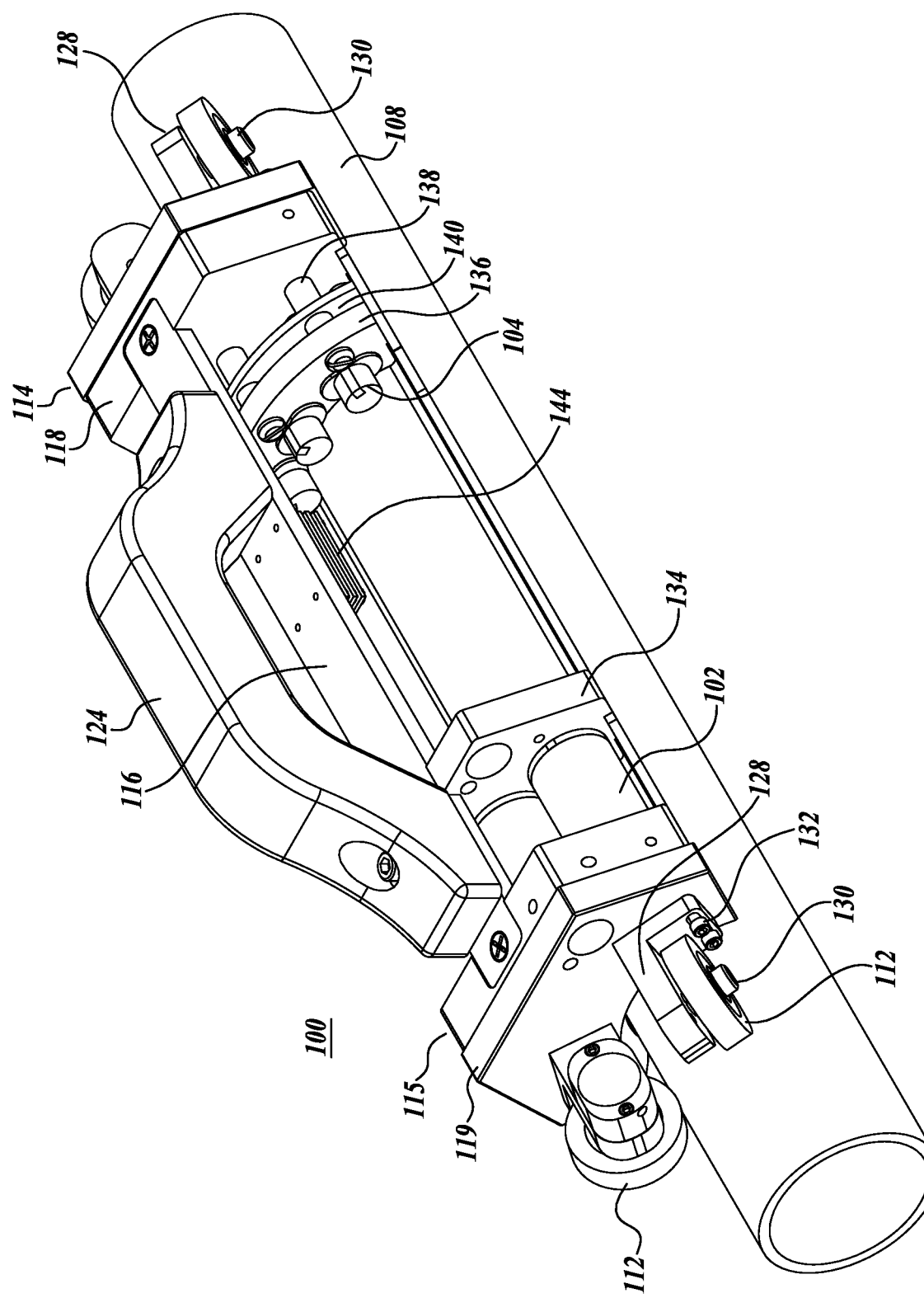
FIG. 2 is a view similar to FIG. 1, but with portions removed to view the interior of the probe.
Figure 3:
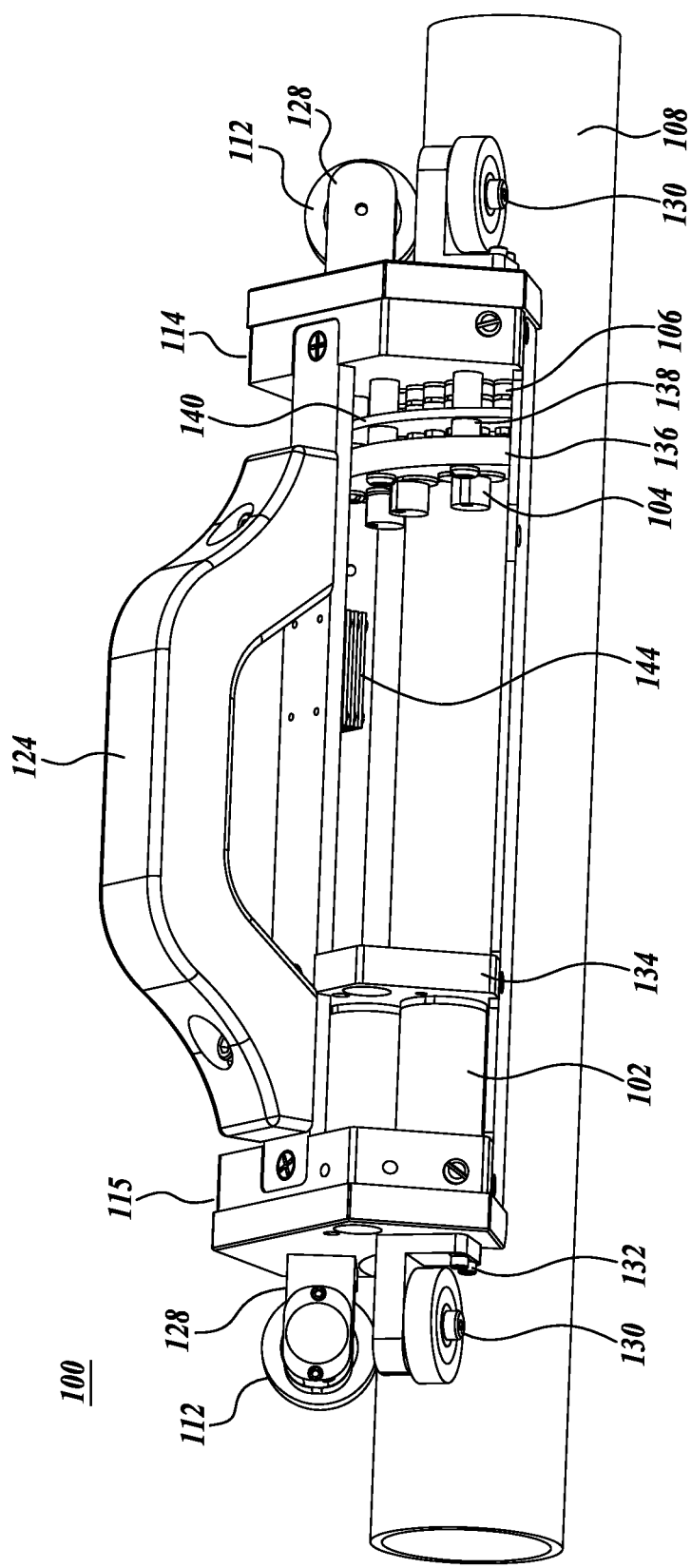
FIG. 3 is a view similar to FIG. 2, but taken from the side of the probe.
Figure 4:
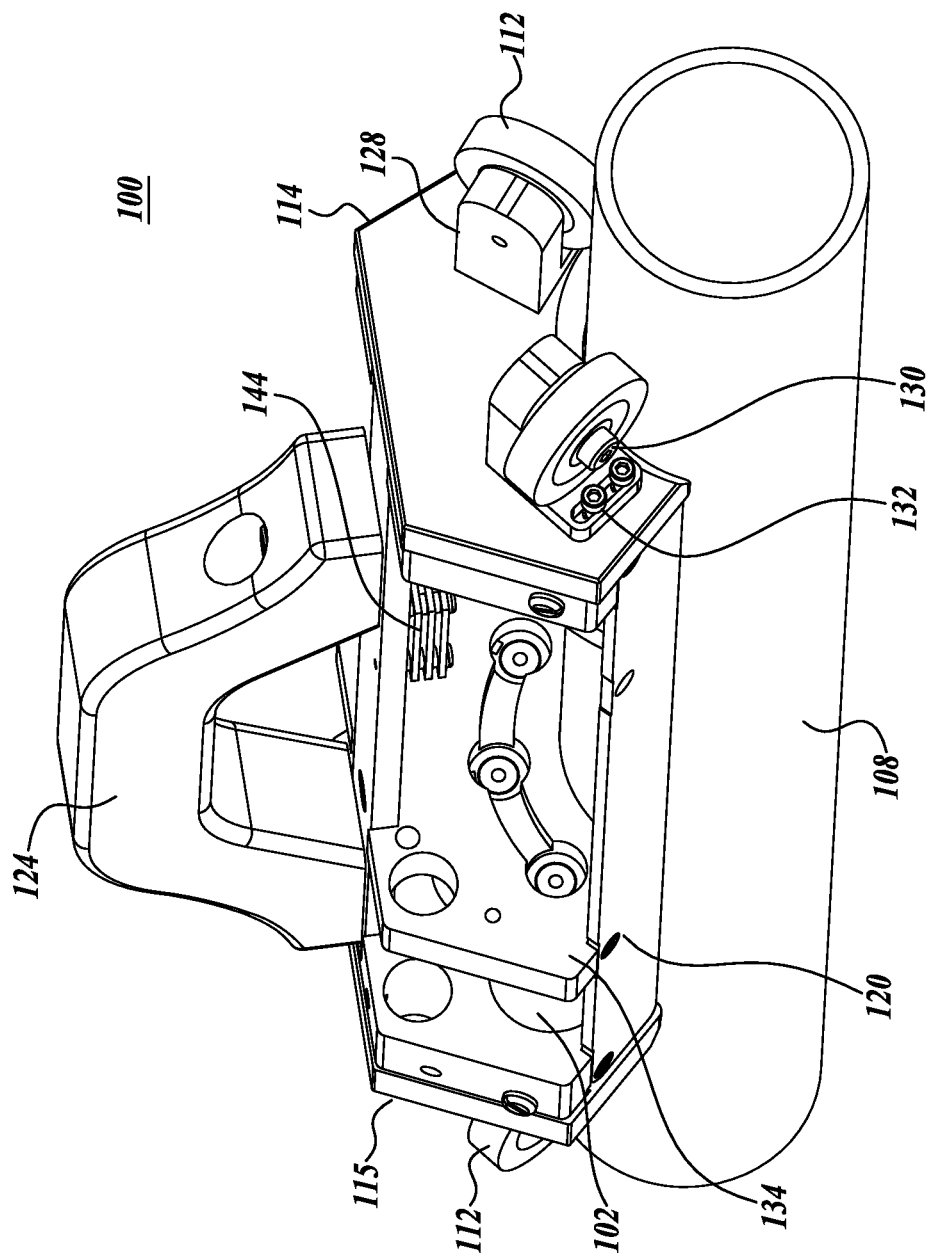
FIG. 4 is a view similar to FIG. 2, but taken from the other end of the probe.
Figure 5:
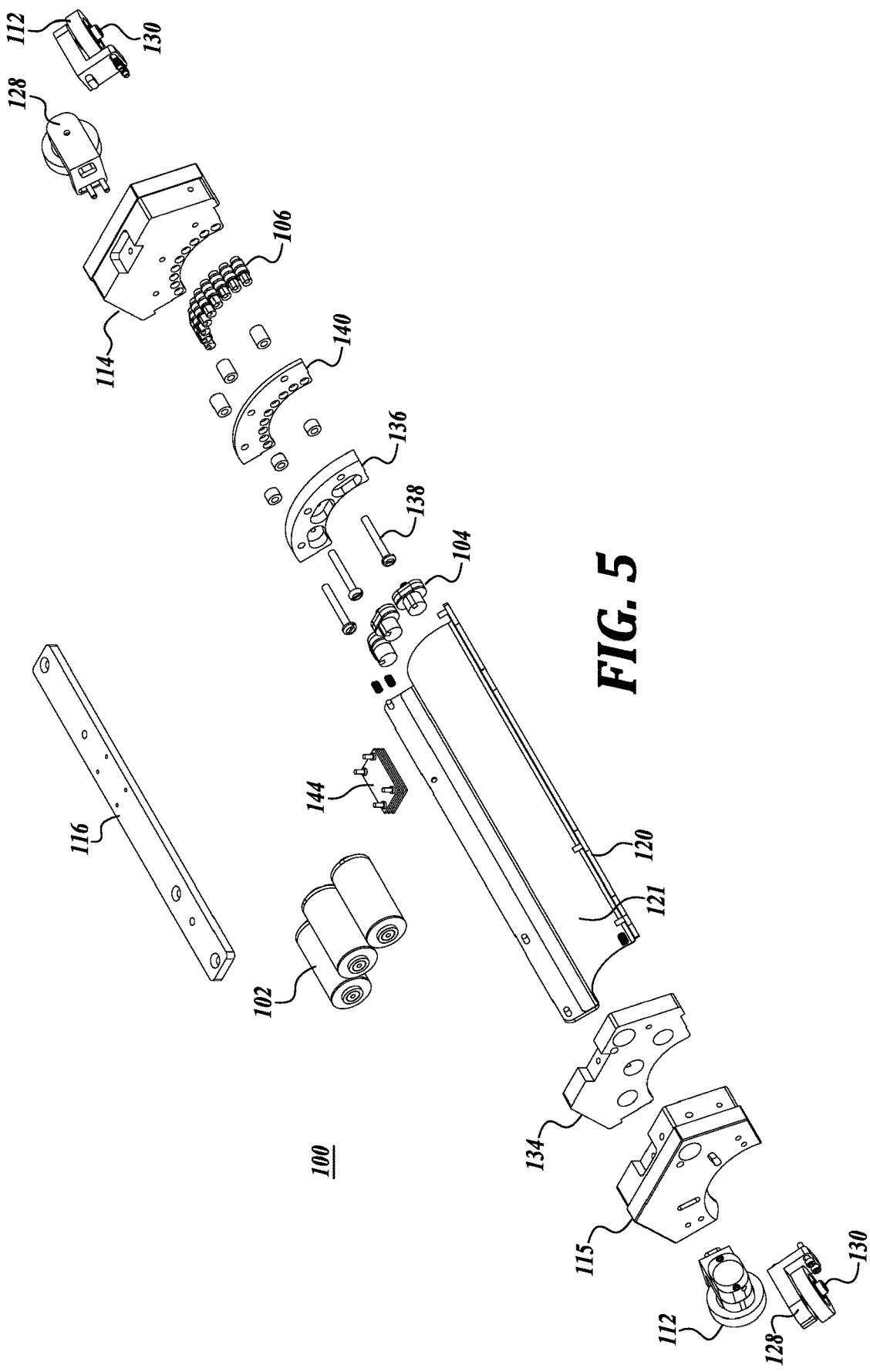
FIG. 5 is a view similar to FIG. 2, but showing the probe in exploded view.
Figure 6:
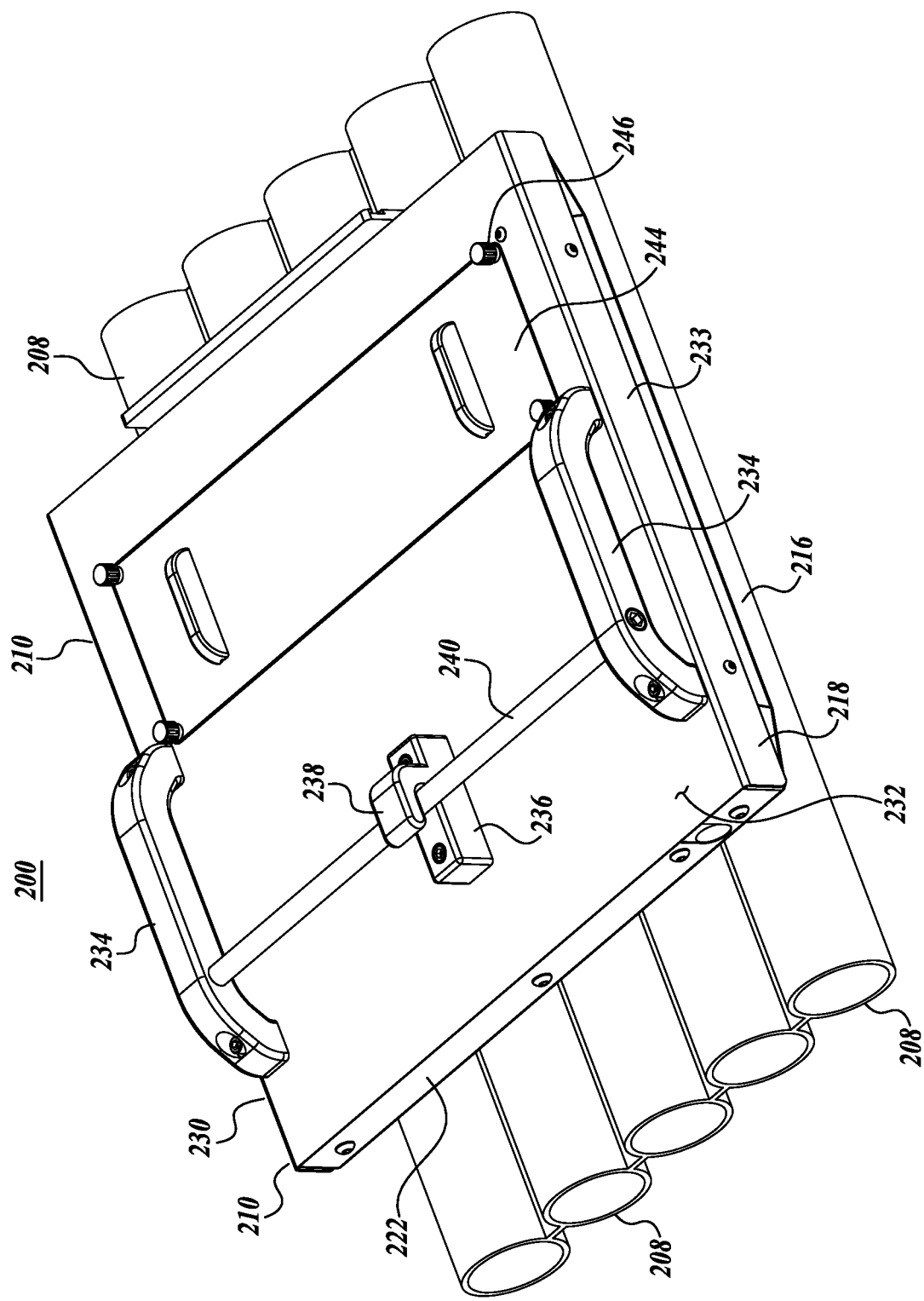
FIG. 6 is an isometric view of another embodiment of the present disclosure.
Figure 7:
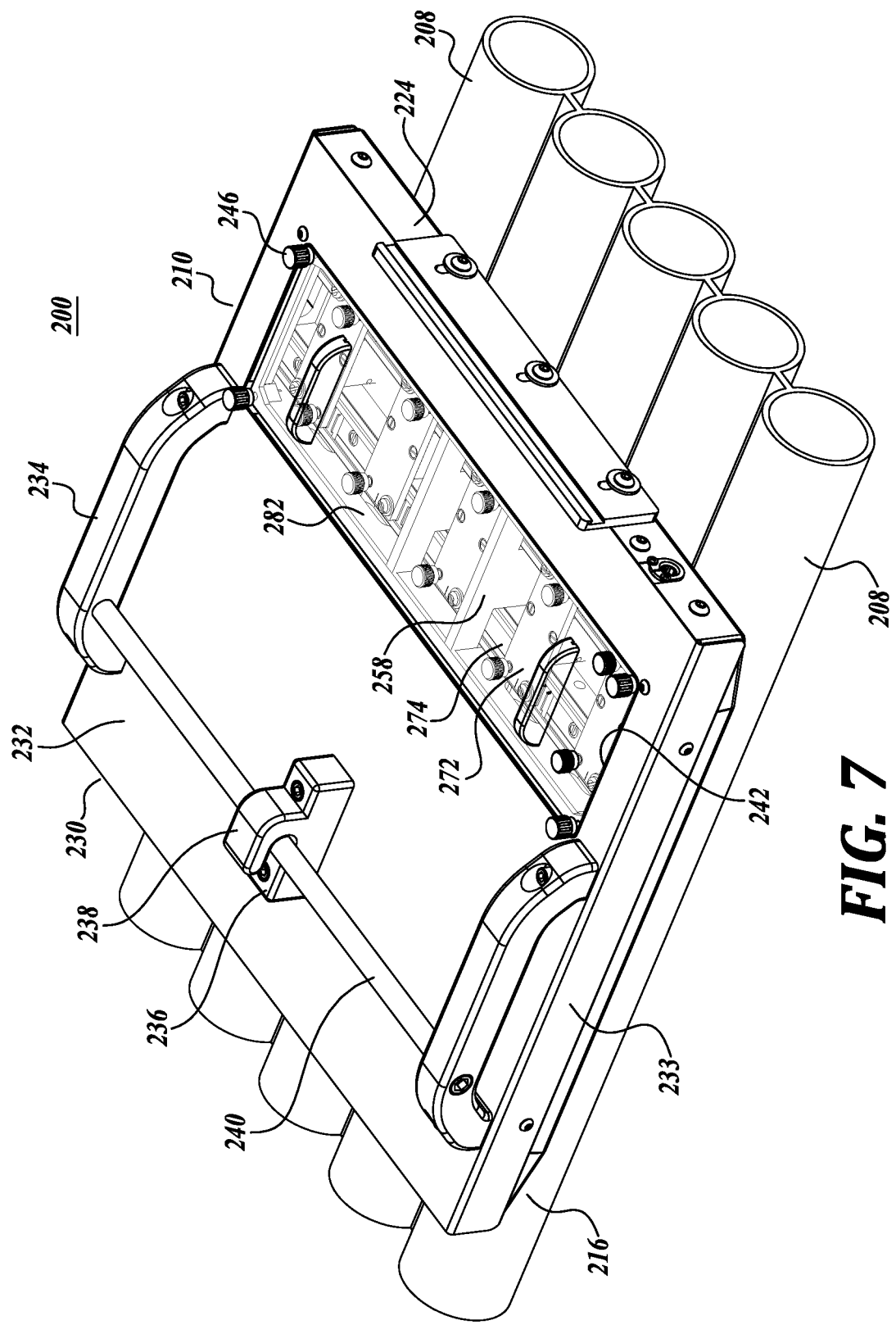
FIG. 7 is a view similar to FIG. 6, but taken from the other end of the probe, and with portions shown as being transparent to enable interior compliments of the probe to be visible.
Figure 8:
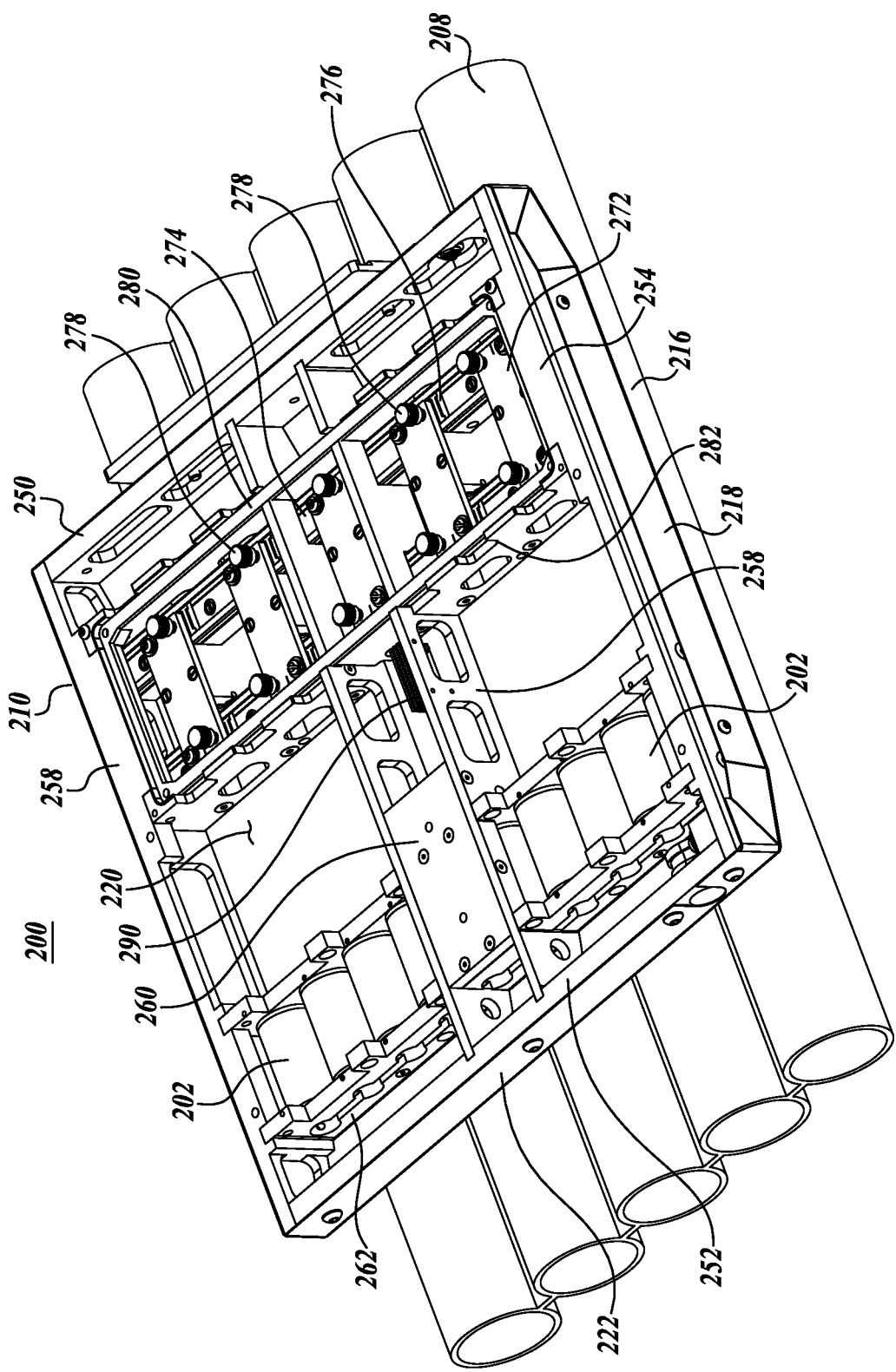
FIG. 8 is a view similar to FIG. 6, but with portions removed to view the interior of the probe.
Figure 9:
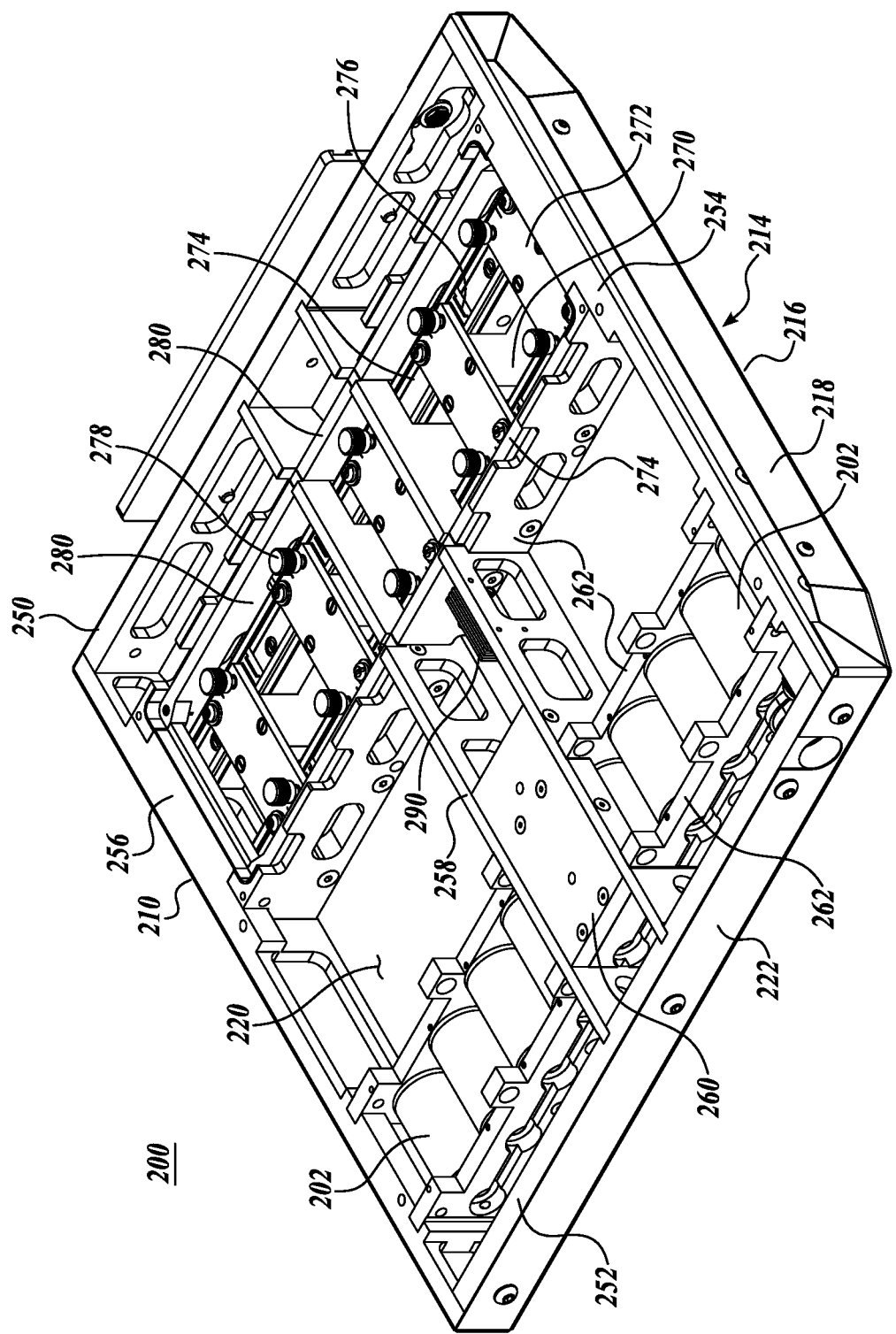
FIG. 9 is a view similar to FIG. 8, but with additional portions removed to view the interior of the problem.
Figure 10:
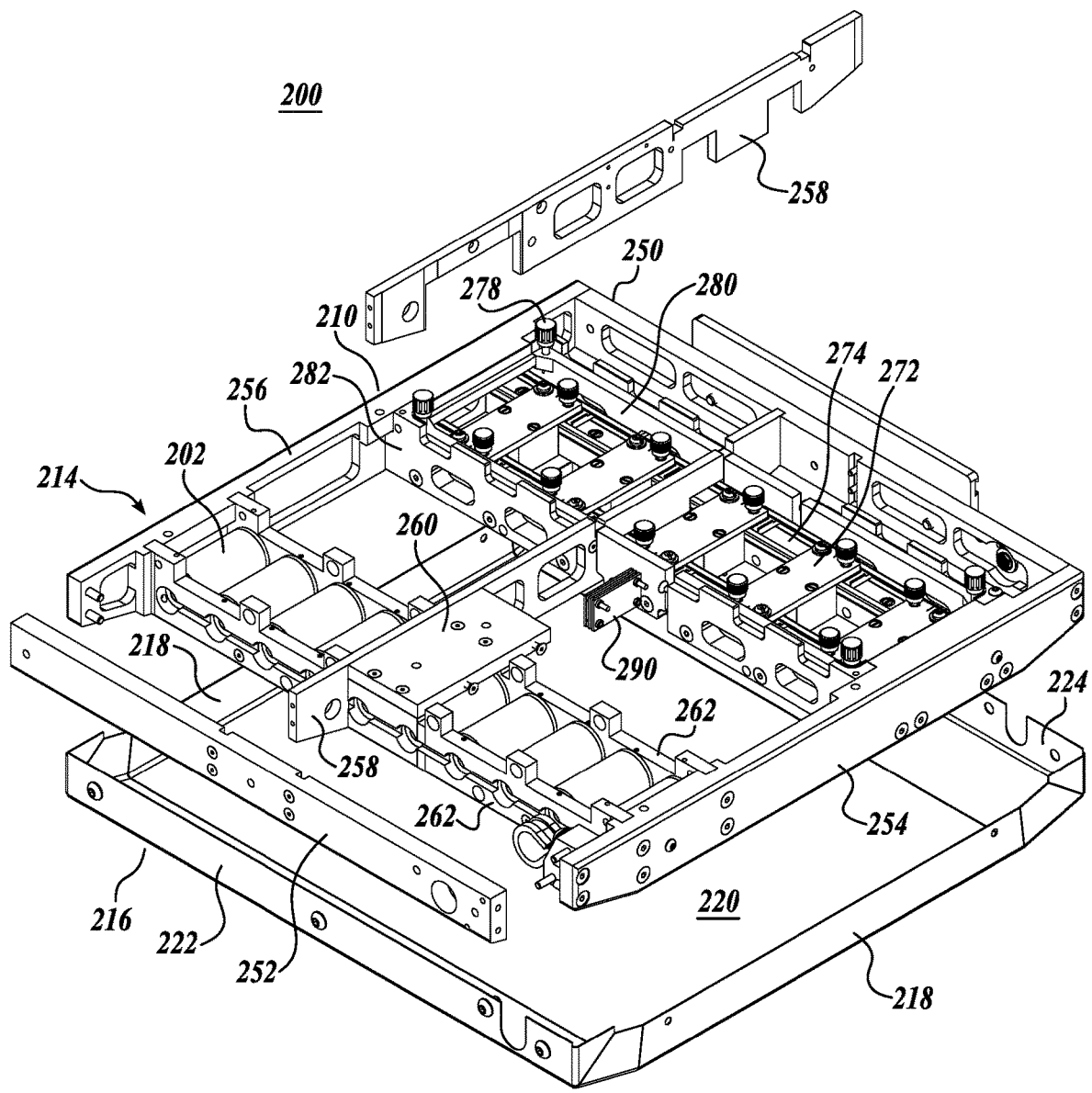
FIG. 10 is a view similar to FIG. 9, shown in partially exploded view.
Figure 11:
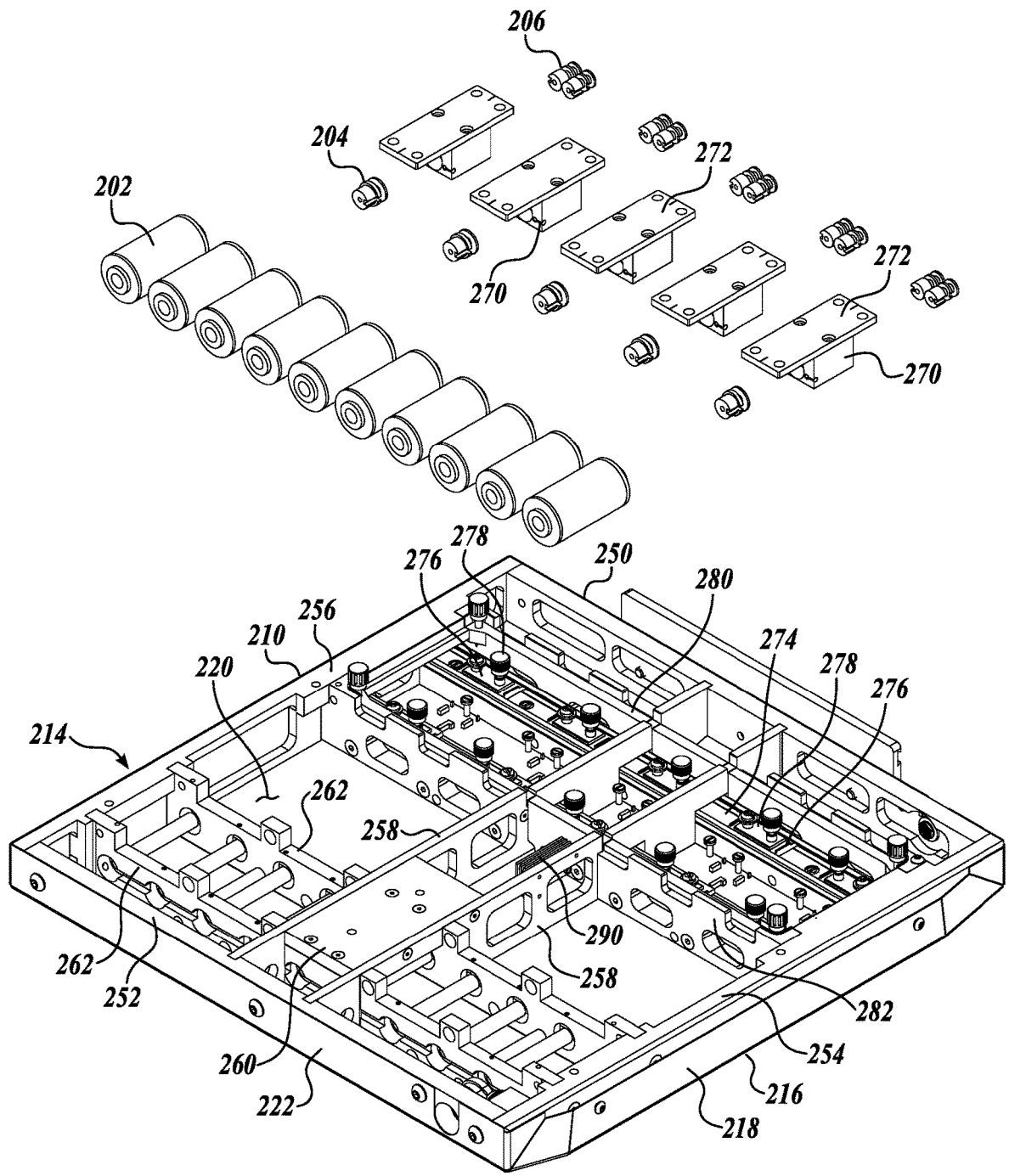
FIG. 11 is a view similar to FIG. 10, but with additional components shown in exploded view.

Next referring specifically to FIGS. 2, 3, and 5, the exciter units 102 are mounted in an arcuate array in blind bores formed in end wall 115. The exciter units project from the end wall 115 to span between the end wall 115 and a support wall 134 spaced from the end wall 115 toward the opposite end wall 114. The support wall 134 is attached to the top beam 116 and the sidewalls 120. The arcuate array of the exciter units 102 corresponds to the curvature of the exterior of the boiler tube 108. By this arrangement, the exciter units 102 extend in an arc of about 120 degrees, thus overlapping the same arc of the boiler tube 108. As such, approximately one third of the circumference of the boiler tube 108 can be inspected by the probe 100. As noted above, this covers most of the "flame side" of the boiler tube 108 where a majority of the defects in the tube occur.

Three detector units 104 are mounted on the opposite end of the probe in an array corresponding to the array of the exciter units 102. The detector units 104 project longitudinally from a support wall 136 toward the end wall 115. The support wall 136 is spaced longitudinally from end wall 114 towards the opposite end wall 115. The support wall 136 is mounted to the inside of the end wall 114 by spacer units 138 that project from the end wall 114 to the support wall 136.

The spacer units 138 also support an intermediate wall 140. As shown in FIG. 5, top edges of the support wall 136 and intermediate wall 140 are arched, with the end edges thereof bearing against the bottom panel 121 and being attached thereto. The detector units 106 extend between the end wall 114 and intermediate wall 140 in an arcuate array along the curved lower edges of the end wall and intermediate wall. As noted above, the detector units 106 are used to detect pits in the boiler tube 108.

Although not shown, electronic compliments for the probe 100 are also housed in the housing 110 between the exciter units 102 and detector units 104/106. These components provide power for the exciter units 102 and detector units 104 and 106 as well as transmit the signals from the detector units to a remote receiving unit. To this end, a preamplifier 144 is mounted on the underside of the top beam 116 to boost the signals from the detector units for transmission to the receiving unit.

In use, the probe 100 is rolled along boiler tube 108 by use of the handle 124. Optionally, the wheels/rollers 112 may be magnetized to assist in maintaining the probe in contact with the boiler tube 108. As the probe 100 moves along the boiler tube 108, the detector units 104 and 106 measure the strength of the magnetic field created by the eddy currents resulting from the main magnetic field created by the exciter units 102. If a defect exists in the boiler tube 104, a change in the eddy current magnetic field is sensed by the detector units 104 and/or 106. This can be visualized as a change in the magnetic field depiction that is being generated by signals from the detector units 104.

Figure 12:
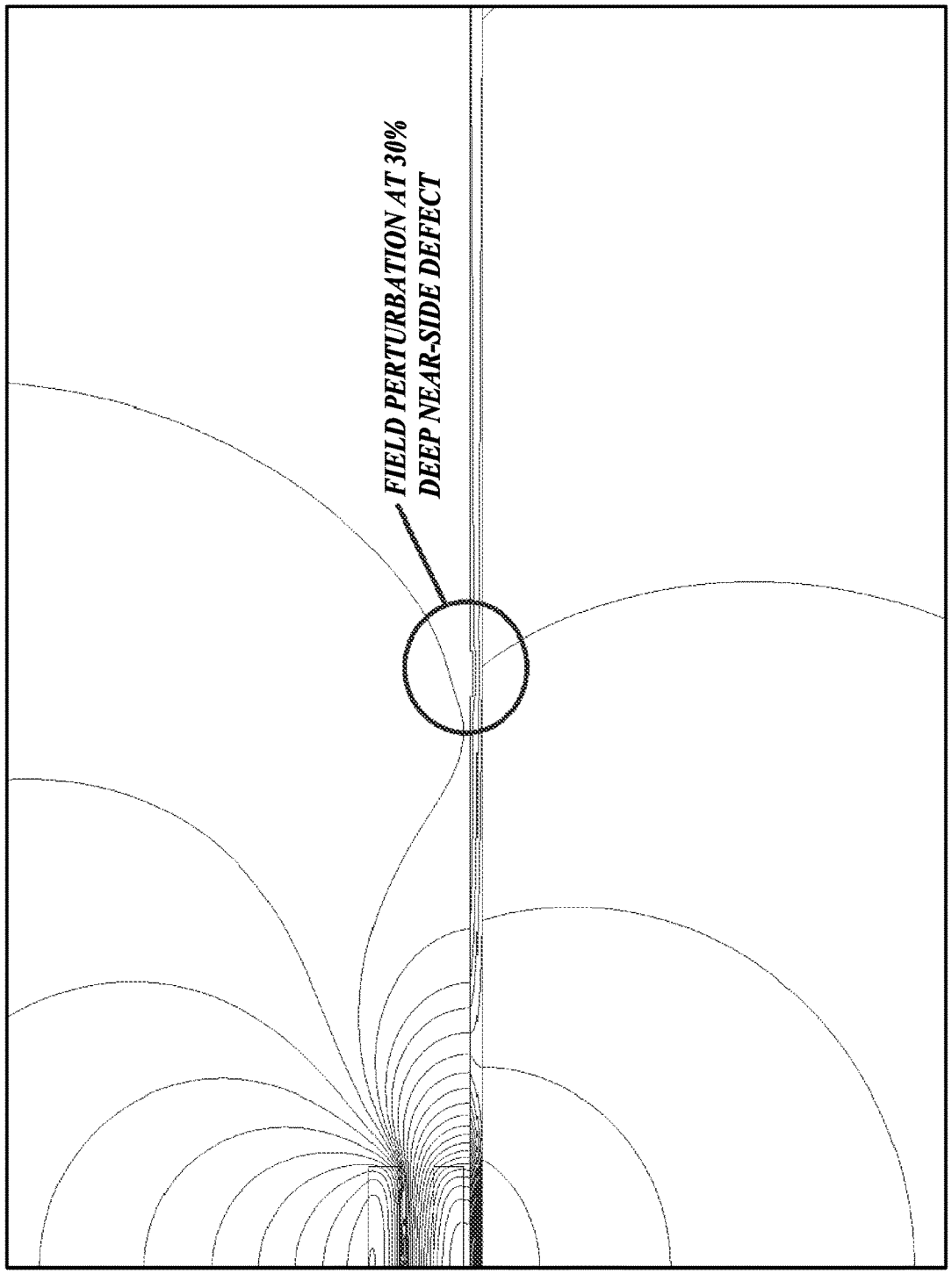
FIG. 12 shows a depiction of a magnetic field created by eddy currents and sensed by a detector unit.
Figure 13:
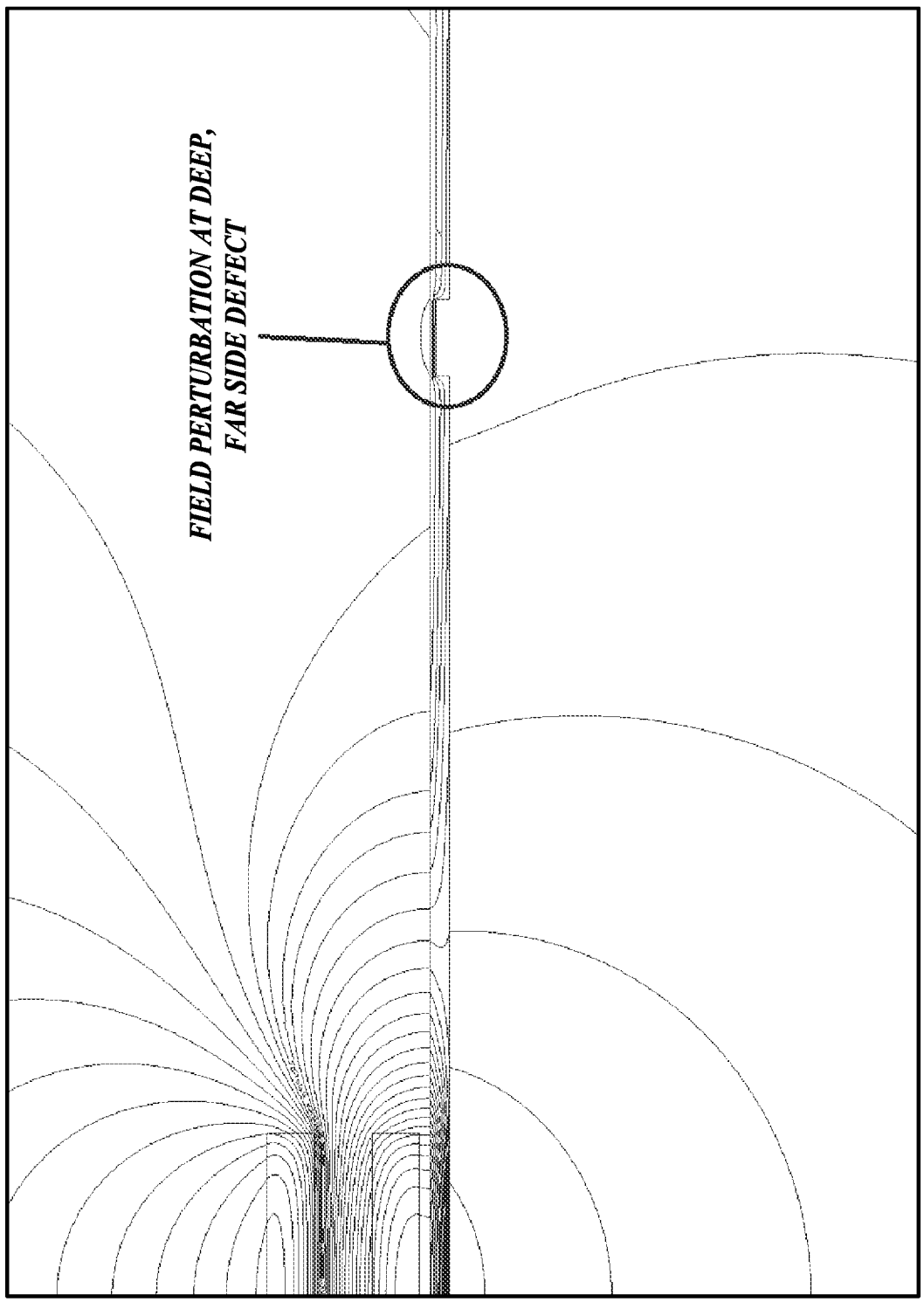
FIG. 13 shows a depiction of a magnetic field created by eddy currents and sensed by a detector unit.
Figure 14:
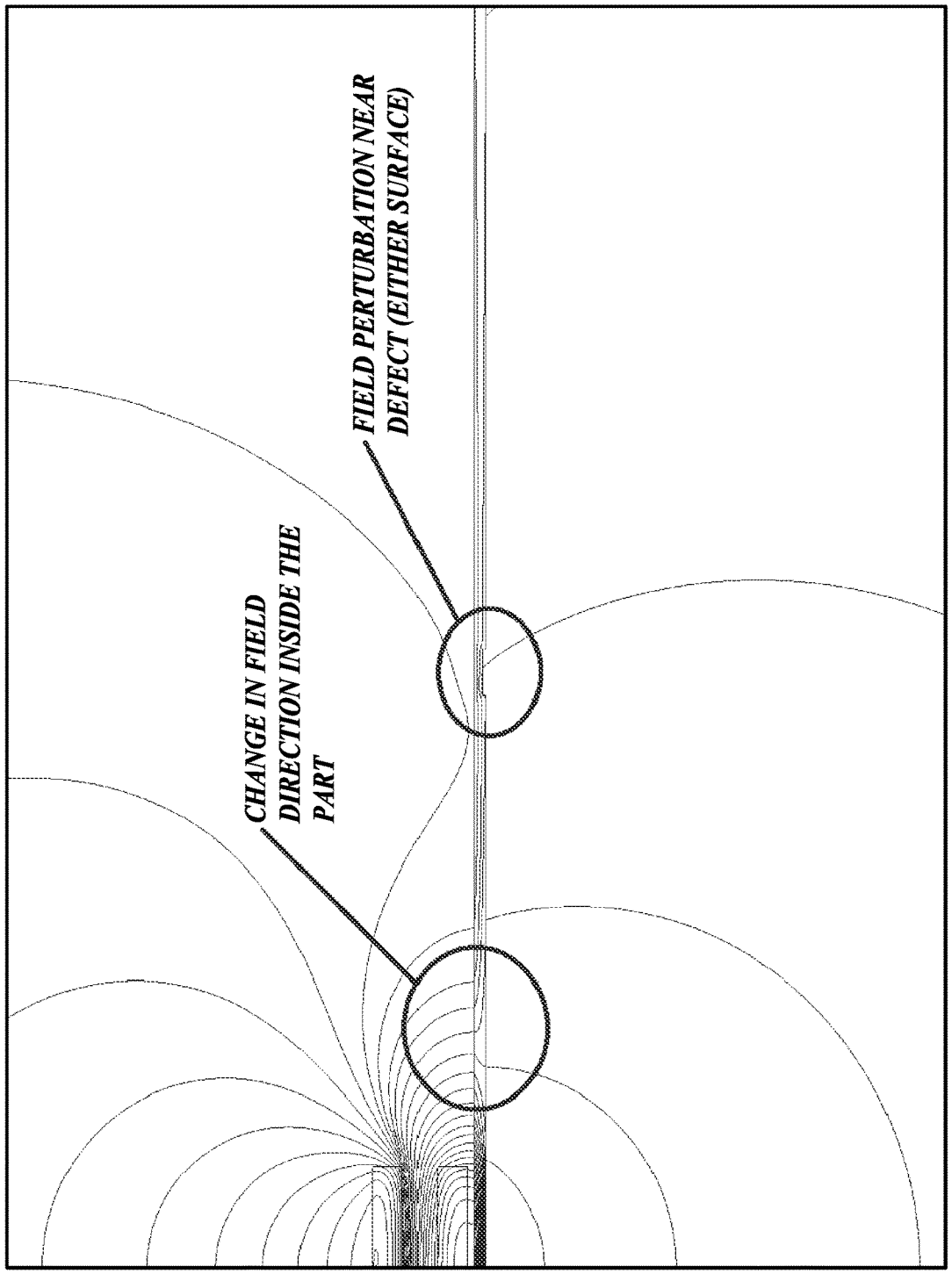
FIG. 14 shows a depiction of a magnetic field created by eddy currents and sensed by a detector unit.

In this regard, FIGS. 12, 13, and 14 show depictions of magnetic fields created by the eddy currents and sensed by the detector units. FIG. 13 shows a magnetic field perturbation due to a defect, which could be on either the inside or outside surface of the boiler tube. The change in field strength near the defect is clearly visible. Note the change in field direction inside of the tube wall close to the exciter coil.

FIG. 13 shows the perturbation of the magnetic field at a deep defect on the inside wall of the boiler tube. Further, FIG. 14 shows the perturbation of the magnetic field in response to a defect extending 30% into the boiler tube wall from the exterior. The perturbations of the magnetic field caused by defects in the boiler tube walls are clearly visible in FIGS. 12, 13, and 14.

The exciter units are powered by the remote receiving unit with a frequency between 1 Hz and 5,000 Hz and a current of maximum 1 amp. The field generated by the exciter units couples to the boiler tubes and spreads out in both axial and circumferential directions in the tube wall. When this alternating field arrives in the vicinity of the detectors it has been attenuated in size and delayed in time. The delay in time is known as "phase lag" or "phase angle" and is proportional to any change in tube wall thickness near the detector units. The detector units are energized by the field within the wall of the tubes, and they transmit their signal via the pre-amps to an external instrument which measures the time delay ("phase lag" or "phase angle") with respect to the exciter signal. The external instrument ("remote receiving unit") may be a standard instrument that is capable of measuring phase lags and signal sizes, usually by means of a "phase-lock loop circuit.

Next describing probe 200 in greater detail, as shown in FIGS. 6-12, the probe 200 includes a housing 210 generally composed of a frame structure 214 for mounting and supporting exciter units to 202 and detector units 204 and 206. A pan structure 216 surrounds the sides of the frame structure 214 and encloses the underside of the frame structure. The pan structure has upwardly extending sidewalls 218 extending upwardly along the sides of a substantially flat bottom wall 220, as well as end walls 222 and 224 also extending upwardly from the bottom wall 220. A cover 230 closes off the top of the frame structure. The cover 230 has a substantially flat top surface 232 as well as side edges 233 extending downwardly from the sides of the top surface to overlap the pan sidewalls 218. Manually graspable handles 234 are mounted along the side margins of the cover. The cover is stiffened by a central bracket 236 secured to the cover with a hook portion 238 that engages over a cross rod 240 that spans between the handles 234. An opening 242 is formed in the cover 230 to provide access to the detector units 204 and 206 so as to be able to adjust the side to side locations of these detector units. The opening 242 is closed off by cover plate 244, held in place by a series of thumbscrews 246.

Referring specifically to FIGS. 9-12, the outer perimeter of frame 214 is composed of elongate end members 250 and 252 attached to the forward and rearward ends of frame side ribs 254 and 256. A pair of longitudinal middle ribs 258 span between central portions of the end members 250 and 252 to enhance the rigidity of the frame 214. A spacer plate 260 is positioned between the middle ribs 258 so as to maintain the side-by-side spacing of the middle ribs. It is to be understood that frame 214 can be constructed in numerous other ways, with the foregoing simply being one example.

A pair of exciter plates 262 span across the frame 214 forwardly of the end member 252 to intersect side ribs 254 and 256 as well as the middle ribs 258. The exciter plates 262 support the exciter units 202 in side-by-side relationship extending across the width of the frame 214. Circular through holes are formed in the exciter plates 266 to receive and support the ends of the exciter units, with the exciter unit coils positioned in the in the gap or separation between the exciter plates.

The detector units 204 and 206 are mounted in a holder unit 270, which supports the detector units 204 to project in the direction toward the exciter units 202, and which supports pairs of detector units 206 to project in the opposite direction. The holder units 270 depend-downwardly from an overhead slide plate 272 that spans between slide rails 274 extending laterally across the frame 214 from side rib 254 to side rib 256. The ends of the side plates 272 are supported by slide pads 276 that are configured to slide within the slide rails 274. The position of the holder units 270 may be adjusted by loosening the hold down thumbscrews 278 that extend through the slide plates 272 and the slide pads 276 to bear against the slide rails 274. This adjustment enables the detector units 204 and 206 to be placed in alignment with the boiler tubes 208 being inspected. The slide rails 274 are supported by support plates 280 and 282 that span across the frame 214 and connect to the frame side ribs 254 and 256. By this construction, the slide rails 274 are held securely in place, which in turn enables the holder units 272 to remain located with respect to the boiler tubes 208. Of course, other means may be employed to support the slide rails 274.

By the foregoing construction, the detector units 204 and 206 may be replaced as an assembly consisting of the holder units 270, slide plates 272, slide rails 274, and support plates 280 and 282. These components may be removed as a unit and replaced from the frame 214 as a unit. This enables the probe 200 to use different types of detector units depending on the construction of the boiler tubes, the condition of the boiler tubes, the types of defects expected, and other factors relevant to the specific boiler tubes being inspected.

Also, by the foregoing construction, the detector units 204 and 206 are positioned at a desired distance from the exciter units 202. This distance depends on the specific exciter units 202 to be utilized as well as the specific detector units 204 and 206 being utilized. Typically, this distance is separation is in the range of from 2 inches to 10 inches, but can be at other distances of separation.

Although not shown, electronic components for the probe 200 are also housed in the housing 210 in the space between the exciter units 202 and detector units 204/206. These components provide power for the exciter units 202 and detector units 204 and 206 as well as transmit the signals from the detector units to a remote receiving unit. To this end, a preamplifier 290 is mounted on one of the middle ribs 258 to boost the signals from the detector units for transmission to the remote receiving unit.

The exciter units are powered by the remote receiving unit with a frequency between 1 Hz and 5,000 Hz and a current of maximum 1 amp. The field generated by the exciter units couples to the boiler tubes and spreads out in both axial and circumferential directions in the tube wall. When this alternating field arrives in the vicinity of the detectors, it has been attenuated in size and delayed in time. The delay in time is known as "phase lag" or "phase angle" and is proportional to any change in tube wall thickness near the detector units. The detector units are energized by the field within the wall of the tubes, and they transmit their signal via the pre-amps to an external instrument which measures the time delay ("phase lag" or "phase angle") with respect to the exciter signal. The external instrument ("remote receiving unit") may be a standard instrument that is capable of measuring phase lags and signal sizes, usually by means of a "phase-lock loop circuit". This instrument is common and is not part of this application.

As noted above the detector units 204 may be composed of absolute coils. Such coils are comprised of a single detector coil that has no reference coil and therefore detects absolutely every change in the magnetic field. Absolute coils will often detect unwanted parameters such as Lift off of the coil
Temperature differences
Material property differences These unwanted parameters can be cancelled by the use of a reference coil positioned appropriately, whereby the absolute coil signal is compared to a reference coil to become a differential pair, i.e., the difference signal is measured, and unwanted signals can be suppressed. One important characteristic for both types of probes is the use of "stacked differential pairs," which effectively cancel the large direct field which carries no information about the tube.

The probe 100 and 200 have a high probability of detection of the top 16 causes of boiler tube failure such as:

Erosion due to carbon particles
Boiler slag damage
Corrosion due to dew point
Creep long-term overheating)
Thermal fatigue
Ash erosion
Soot blower erosion
Hydrogen damage
Weld failures
Blisters (short term overheating)
Oxygen pitting and corrosion
Caustic attack
Acidic corrosion
Fatigue corrosion
Stress corrosion cracking.

While illustrative embodiments have been illustrated and described, it will be appreciated that various changes can be made therein without departing from the spirit and scope of the invention. In this regard the probe 200 could be designed to inspect a larger number or a smaller number of boiler tubes than the configuration of the probe 200 described above, which is designed to inspect simultaneously five boiler tubes.

Also, in the configuration of the probe 200 described above, two exciter units 202 are employed per boiler tube; however, the probe could be configured so that a larger number of exciter units are employed per boiler tube, for example three exciter units as described above with respect to probe 100.

Also, a different number of detector units 204 and 206 may be employed than as described above. For example, two or more exciter units 204 may be employed per boiler tube 208. Further, more than two detector units 206 may be utilized for boiler tube 208, for example, 3 or 4 detector units 206 per boiler tube.

In addition, the probes, such as probes 100 and 200, can be constructed so that the separation between the exciter units and detector units may be adjustable to accommodate the specific exciter units and detector units being utilized. As such, a singular housing may be employed with different exciter units and detector units.

Correspondingly, detector units other than the detector units 104, 106, 204, or 206 may be employed in the boiler tube probes of the present disclosure. Such other detector units may include for example Hall effect sensors, magneto-diodes, magneto-transistors, Anisotropic Magneto-Resistive (AMR) magnetometers, and GMR magnetometers.

The embodiments of the invention in which an exclusive property or privilege is claimed are defined as follows:

1. A probe for inspecting boiler tubes having a transverse curvature for structural defects, comprising:
   a rigid longitudinally extending housing configured to move longitudinally along the exterior of the boiler tubes being inspected;
   a plurality of individual exciter units supported by the housing and producing an alternating magnetic field when driven by an alternating current source, the magnetic field passing through the boiler tube walls and coupled with the boiler tube walls to induce the creation of eddy currents which in turn generate their own magnetic fields, the exciter units defining a longitudinal configuration extending along the length of the housing, the plurality of individual exciter units arrayed in the housing in side-by-side relationship to each other to correspond to the transverse curvature of the boiler tubes and oriented to produce the alternating magnetic field to extend along the length of the boiler tubes being inspected; and
   a plurality of individual detector units supported by the housing at longitudinal locations in the housing spaced from the individual exciter units, the detector units configured to detect the magnetic fields generated by the eddy currents that are induced in the boiler tube walls by the alternating magnetic field generated by the exciter units, the detector units arrayed in the housing in side-by-side relationship to each other to correspond to the transverse curvature of the boiler tubes, the detector units spaced from the exciter units in a direction along the length of the boiler tube being inspected, the detector units detecting the configuration and strength of the magnetic fields generated by the eddy currents that are induced in the boiler tube walls by the alternating magnetic field generated by the exciter units.

2. The probe according to claim 1, wherein the detector units comprise a magnetometer in the form of a small-scale micro-electrical mechanical device capable of detecting and measuring the magnetic field generated by the eddy currents.

3. The probe according to claim 1, wherein the detector units comprise devices configured to detect and quantify general wall thinning.

4. The probe according to claim 3, wherein the detector units comprise absolute coils.

5. The probe according to claim 1, wherein the detector units comprise devices configured to detect pits formed in the boiler tube.

6. The probe according to claim 5, wherein the detector units comprise differential coils.

7. The probe according to claim 1, wherein at least two different types of the detector units are employed, with each type of the detector units being specific to a particular defect occurring in the boiler tube.

8. The probe according to claim 7, wherein the detector units are designed to detect and quantify a defect in the boiler tube selected from the group including general wall thinning, pitting, thermal fatigue, cracking, flame erosion, corrosion, and creep damage.

9. The probe according to claim 1, wherein the detector units are positioned at a distance from the exciter units, wherein the dominant magnetic field detected by the detector units is the eddy current induced magnetic field.

10. The probe according to claim 1, wherein the alternating current applied to the exciter units is in the range of less than 1 Hz to 500 Hz.

11. The probe according to claim 1, wherein the array defined by the side-by-side individual detectors extends less than one half of the total transverse curvature of the boiler tube.

12. The probe according to claim 11, wherein the array defined by the side-by-side individual detectors extends no more than one-third of the total transverse curvature of the boiler tube.

13. A method of detecting defects in boiler tubes, comprising:
    placing a probe constructed in accordance with claim 1 proximal to the exterior surface of the boiler tube, and moving the probe on the tube along the length of the tube; and
    while moving the probe, producing an alternating magnetic field with the exciter units driven by an alternating current and detecting the magnetic field generated by the induced eddy currents caused by the alternating magnetic field produced by the exciter units using detector units.

14. The method of claim 13, wherein the alternating current applied to the exciter units is in the range of less than 1 Hz to 500 Hz.

15. The method of claim 13, wherein the probe is positioned proximal to the crown of the boiler to be inspected.

16. The method according to claim 13, wherein the detector units comprise a magnetometer in the form of a small-scale micro-electrical mechanical device capable of detecting and measuring the magnetic field generated by the eddy currents.

17. The method according to claim 13, wherein the detector units comprise devices configured to detect and quantify general wall thinning.

18. The method according to claim 13, wherein the detector units comprise devices configured to detect pits formed in the boiler tube.

19. The method according to claim 13, wherein the detector units comprise differential coils.

20. The method according to claim 13, wherein at least two different types of the detector units are employed, with each type of the detector units being specific to a particular defect occurring in the boiler tube.

21. The method according to claim 13, wherein the detector units are designed to detect and quantify a defect in the boiler tube selected from the group including general wall thinning, pitting, thermal fatigue, cracking, flame erosion, corrosion, and creep damage.

22. The method according to claim 13, wherein the detector units are positioned at a distance from the exciter units.

* * * * *